(12) United States Patent
Chen et al.

(10) Patent No.: US 7,298,967 B2
(45) Date of Patent: Nov. 20, 2007

(54) ELECTROMAGNETIC SENSOR DIRECT COMMUNICATION ALGORITHM TO A DIGITAL MICROPROCESSOR

(75) Inventors: Shaotang Chen, Troy, MI (US);
Sayeed A. Mir, Saginaw, MI (US);
Tom C. Wong, Saginaw, MI (US);
Christian Ross, Hemlock, MI (US);
Tomy Sebastian, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 405 days.

(21) Appl. No.: 11/111,389

(22) Filed: Apr. 21, 2005

(65) Prior Publication Data

US 2006/0241790 A1    Oct. 26, 2006

(51) Int. Cl.
*H02P 7/29* (2006.01)
(52) U.S. Cl. .................. 388/811; 388/812; 388/813; 388/814; 318/139
(58) Field of Classification Search ................ 388/812, 388/813, 814; 318/139; 702/151; 180/446; 340/443
See application file for complete search history.

(56) References Cited

U.S. PATENT DOCUMENTS 6,719,089 B2    4/2004  Yoneda et al. ............... 180/446
6,754,610 B2    6/2004  Dudler et al. ................ 702/151
2004/0130442 A1*  7/2004  Breed et al. ................. 340/443

* cited by examiner

Primary Examiner—Karen Masih
(74) Attorney, Agent, or Firm—Michael D. Smith

(57) ABSTRACT

A method of interfacing an electromagnetic sensor with a controller in a motor control system, the method including: applying an excitation signal to the electromagnetic sensor; receiving a first electromagnetic sensor output signal based on the excitation signal, the first electromagnetic sensor signal comprising an amplitude modulated signal corresponding to a position of a rotor of the electromagnetic sensor; and receiving a second electromagnetic sensor output signal based on the excitation signal, the second electromagnetic sensor signal comprising another amplitude modulated signal corresponding to the position of the rotor of the electromagnetic sensor. The method also includes sampling the first electromagnetic sensor signal and the second electromagnetic sensor signal at about an instance synchronous with the excitation signal to demodulate the first electromagnetic sensor signal and the second electromagnetic sensor signal and decoding a resultant of the sampling to identify the position of a rotor of the electromagnetic sensor.

31 Claims, 3 Drawing Sheets

ELECTROMAGNETIC SENSOR DIRECT COMMUNICATION ALGORITHM TO A DIGITAL MICROPROCESSOR

TECHNICAL FIELD

This invention relates to electric machines, and more particularly, position sensing of a motor employing a electromagnetic sensor.

BACKGROUND OF THE INVENTION

Electric Steering applications such as Electric Power Steering (EPS), four wheel steering e.g., Quadrasteer (Qsteer) Active Front Steer (AFS), Active Rear Steer (ARS) are used in vehicles to improve performance fuel economy and stability of the vehicle. Commonly, in such systems an electronic controller is configured to drive an electric motor to provide torque, speed or positioning control.

Electric steering systems often employ digital encoders for motor position feedback. Owing to their low cost and capability of operating at high temperature and in harsh environment, Hall type sensor based encoders are preferred in electric steering motor drive applications than those employing optical detection. Hall effect position sensors are, however, very limited in providing high resolution position and/or speed signals, often required for desirable performance of an electric steering system. Although, resolvers have traditionally been used to provide high precision position and speed information for servo drives, the cost of both the resolver itself and the associated electronics for interfacing a resolver with a digital motor controller have long prevented them from being used in the low cost automotive products. Advantageously, in the past few years, a variable reluctance resolver has been developed, which features a very simple, rugged structure and yet is cost competitive to Hall effect encoders. However, the additional cost of the associated electronics to interface a resolver to a microprocessor or digital controller still presents a significant impediment to commercial viability and the potential to replace the Hall encoders for automotive applications. Therefore, what is desired in the art is a means for interfacing a resolver with a digital motor controller or microprocessor without the expense of traditional electronic interfaces and conversion circuits.

SUMMARY OF THE INVENTION

Disclosed herein in an exemplary embodiment is a method of interfacing an electromagnetic sensor with a controller in a motor control system, the method comprising: applying an excitation signal to the electromagnetic sensor; receiving a first electromagnetic sensor output signal based on the excitation signal, the first electromagnetic sensor signal comprising an amplitude modulated signal corresponding to a position of a rotor of the electromagnetic sensor; and receiving a second electromagnetic sensor output signal based on the excitation signal, the second electromagnetic sensor signal comprising another amplitude modulated signal corresponding to the position of the rotor of the electromagnetic sensor. The method also includes sampling the first electromagnetic sensor signal and the second electromagnetic sensor signal at about an instance synchronous with the excitation signal to demodulate the first electromagnetic sensor signal and the second electromagnetic sensor signal and decoding a resultant of the sampling to identify the position of a rotor of the electromagnetic sensor.

Also disclosed herein in an exemplary embodiment is a system for interfacing a electromagnetic sensor with a controller comprising: a electromagnetic sensor, the electromagnetic sensor receptive to an excitation signal and transmitting a first electromagnetic sensor output signal based on the excitation signal and a second electromagnetic sensor output signal based on the excitation signal, the first electromagnetic sensor signal comprising an amplitude modulated signal corresponding to a position of a rotor of the electromagnetic sensor, the second electromagnetic sensor signal comprising another amplitude modulated signal corresponding to the position of said rotor of the electromagnetic sensor. The system also includes a controller receptive to the first electromagnetic sensor output signal and the second electromagnetic sensor signal; the controller sampling the first electromagnetic sensor signal and the second electromagnetic sensor signal at about an instance synchronous with the excitation signal to demodulate the first electromagnetic sensor signal and the second electromagnetic sensor signal; the controller further decoding a resultant of the sampling to identify the position of a rotor of the electromagnetic sensor.

Further, disclosed herein in yet another exemplary embodiment is a system for interfacing a electromagnetic sensor with a controller comprising: means for applying an excitation signal to the electromagnetic sensor; means for receiving a first electromagnetic sensor output signal based on the excitation signal, the first electromagnetic sensor signal comprising an amplitude modulated signal corresponding to a position of a rotor of the electromagnetic sensor; and means for receiving a second electromagnetic sensor output signal based on the excitation signal, the second electromagnetic sensor signal comprising another amplitude modulated signal corresponding to the position of the rotor of the electromagnetic sensor. The system also includes: means for sampling the first electromagnetic sensor signal and the second electromagnetic sensor signal at about an instance synchronous with the excitation signal to demodulate the first electromagnetic sensor signal and the second electromagnetic sensor signal; and means for decoding a resultant of the sampling to identify the position of a rotor of the electromagnetic sensor.

Further disclosed here in another embodiment is a storage medium encoded with machine-readable computer program code for of interfacing a electromagnetic sensor with a controller, the storage medium including instructions for causing a computer to implement the abovementioned method.

Disclosed in yet another exemplary embodiment is a computer data signal embodied in a computer readable medium, the computer data signal comprising code configured to cause a computer to implement the abovementioned method for of interfacing a electromagnetic sensor with a controller.

BRIEF DESCRIPTION OF THE DRAWINGS

Referring to the exemplary drawings wherein like elements are numbered alike in the several Figures.

DESCRIPTION OF AN EXEMPLARY EMBODIMENT

Disclosed herein in an exemplary embodiment is an electric steering system, which employs an electromagnetic sensor e.g. resolver or synchro, hereinafter resolver for position and speed feedback. The system utilizes its controller microprocessor or DSP to generate the high frequency resolver excitation and to directly sample the resolver output signals. The resolver signals are then processed internally by the microprocessor or DSP to decode the position and speed information. Since the resolver interfaces are performed by the EPS microcontroller, it eliminates the needs for a dedicated hardware to do the resolver to digital conversion and cost of the steering system can be significantly reduced. Another obvious benefit is that it becomes relatively easy for the EPS controller to provide diagnosis of the resolver operating conditions and to provide compensation for phase delay in the cables and thus enhance the position accuracy.

Figure 1:
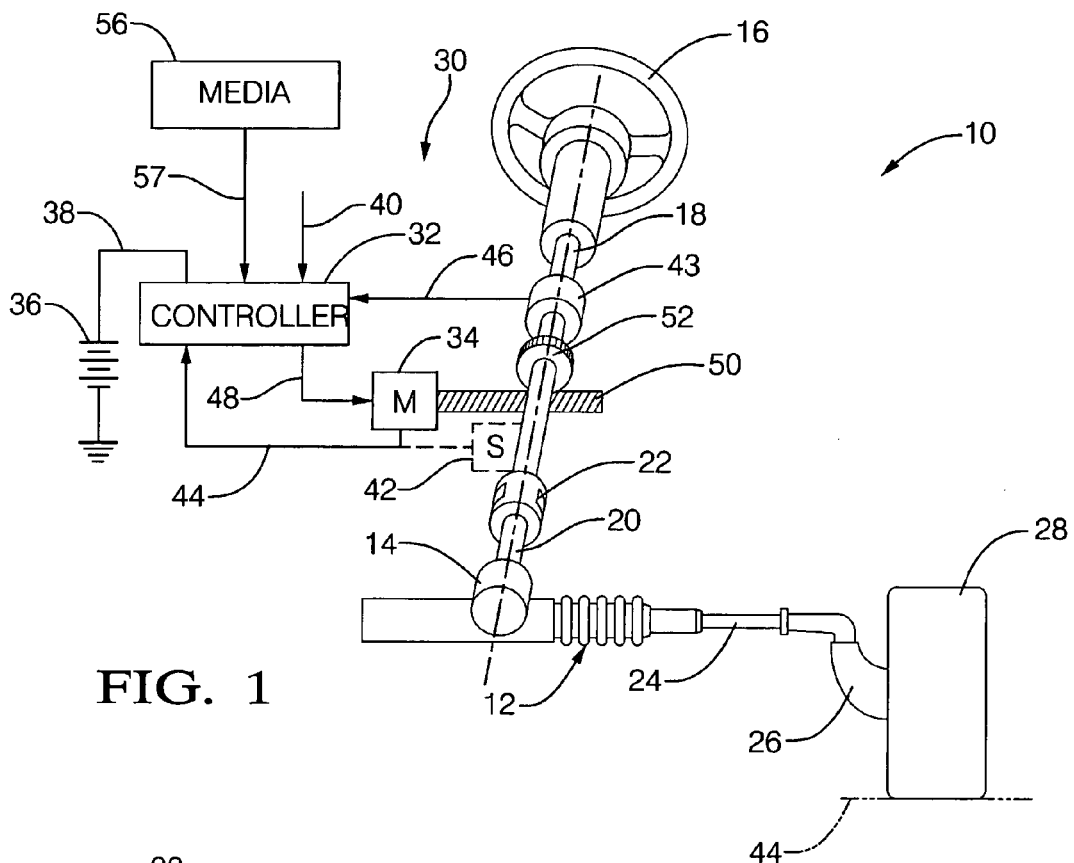
FIG. 1 is a block diagram of a electric steering system in accordance with an exemplary embodiment.

Referring to FIG. 1, reference numeral 10 generally designates an Electric Power Steering (EPS) system for a motor vehicle employing an exemplary embodiment of the resolver interfaces disclosed herein. In an exemplary embodiment, a steering mechanism 12 is a rack-and-pinion type mechanism that includes a toothed rack (not shown) and a pinion gear (also not shown) located under a gear housing 14. A steering wheel 16 is coupled to an upper steering shaft 18. As the steering wheel 16 is turned, the upper steering shaft 18, which is connected to a lower steering shaft 20 through a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist is provided through a control system generally designated by reference numeral 30, which includes a controller 32 and an electric motor 34. The controller 32 is powered by a vehicle power supply 36 through a supply line 38. The controller 32 receives a signal indicative of the vehicle velocity on signal line 40. Steering angle and/or motor position is measured by position sensor 42 and position signal θ is fed to the controller 32 through line 44. It will be appreciated that position as measured may be based on the steering shaft and/or motor position as indicated in the figure and hereinafter referred to as motor position or position information θ. In an exemplary embodiment, position sensor 42 is a resolver coupled directly to controller 32, and hereinafter referred to as resolver 42. It will be appreciated that while in an exemplary embodiment a resolver is depicted for illustrative purposes, other types of position sensors (e.g., synchros) exhibiting similar qualities and capabilities may be employed. The controller 32 is usually implemented in a digital format and thus a microcontroller unit (MCU) or digital signal processor (DSP) is readily available. The controller 32 is responsible for processing the steering command from the operator, generating the required signal for driving the motor 34 through a power inverter (not shown, and optionally integral with the controller 32). In addition, the system on an exemplary embodiment relies on the controller 32, and particularly the MCU or DSP to perform the resolver signal processing functions, which decode the high-resolution position and speed feedback from the resolver 42.

Resolvers 42 measure the angular position of a rotating device. They are essentially rotating transformers with an excitation winding and two output windings exhibiting a mutual 90° (degree) electrical displacement. The transfer ratio of the resolver from the excitation winding to the two output windings is a sinusoidal function of the rotor position θ. The excitation winding is supplied with an AC voltage, usually a sinusoidal waveform, with a constant frequency and amplitude. The AC excitation produces a magnetic flux in the magnetic circuit of the resolver, which induces an output signal in each of the two output windings. Due to the rotor position dependent transfer ratio, the amplitudes of the two output signals will be modulated by the rotor position in a sinusoidal format. In other words, the amplitudes of the two output signals are a function of sin θ and cos θ, respectively, due to its 90-degree displacement. It will also be appreciated that for a synchro position sensor similar trigonometric relationships describe the synchro signals as is well known in the art. The synchro signals include information regarding sin θ, sin (θ+120), and sin(θ+240).

To utilize this transformer property of the resolver, a high frequency generator is employed to produce the excitation, usually at around 10 KHz to 20 KHz. Also, to derive the position information θ, the sin θ and cos θ information carried over the high frequency signals needs to be demodulated to remove the high frequency carrier information. Finally, the sin θ and cos θ information is processed employing series expansions, trigonometric functions, and the like to obtain the position information θ. In existing systems a dedicated resolver to digital (R/D) converter is required to perform all these functions and supply the position information θ to a digital microcontroller. An exemplary embodiment of the system and methodology disclosed herein avoids the substantial cost and complexity of an R/D converter by directly interfacing the resolver 42 to a microcontroller and provides a method for direct decoding of resolver signals. It will be appreciated that as used herein position information and angle are treated synonymously. In an exemplary embodiment a resolver 42 is employed, the position information θ corresponding to a rotational angle of the device. It will be further appreciated that as used herein the position sensor, e.g., resolver 42 may be a multiple pole electrical machine, preferably where the number of poles therein is proportional to the number of poles in the motor 34.

Continuing with FIG. 1, for more on the steering system 10, as the steering wheel 16 is turned, the torque sensor 43 senses the torque applied to the steering wheel 16 by a vehicle operator. The torque sensor 43 may include a torsion bar (not shown) and a variable-resistance type of sensor (also not shown) that outputs a variable resistance signal to controller 32 through line 46 in relation to the amount of twist on the torsion bar. Although this is the currently illustrative torque sensor, any other suitable torque-sensing device used with known signal processing techniques will suffice.

In response to the inputs on lines 40, 44, 46, and the like, the controller 32 sends a command signal through line 48 to the electric motor 34. The motor 34, in turn, supplies torque-assist to the steering system through a worm 50 and a worm gear 52, in order to provide a steering torque assist to the vehicle steering system in addition to a steering force exerted by the vehicle operator.

Figure 2:
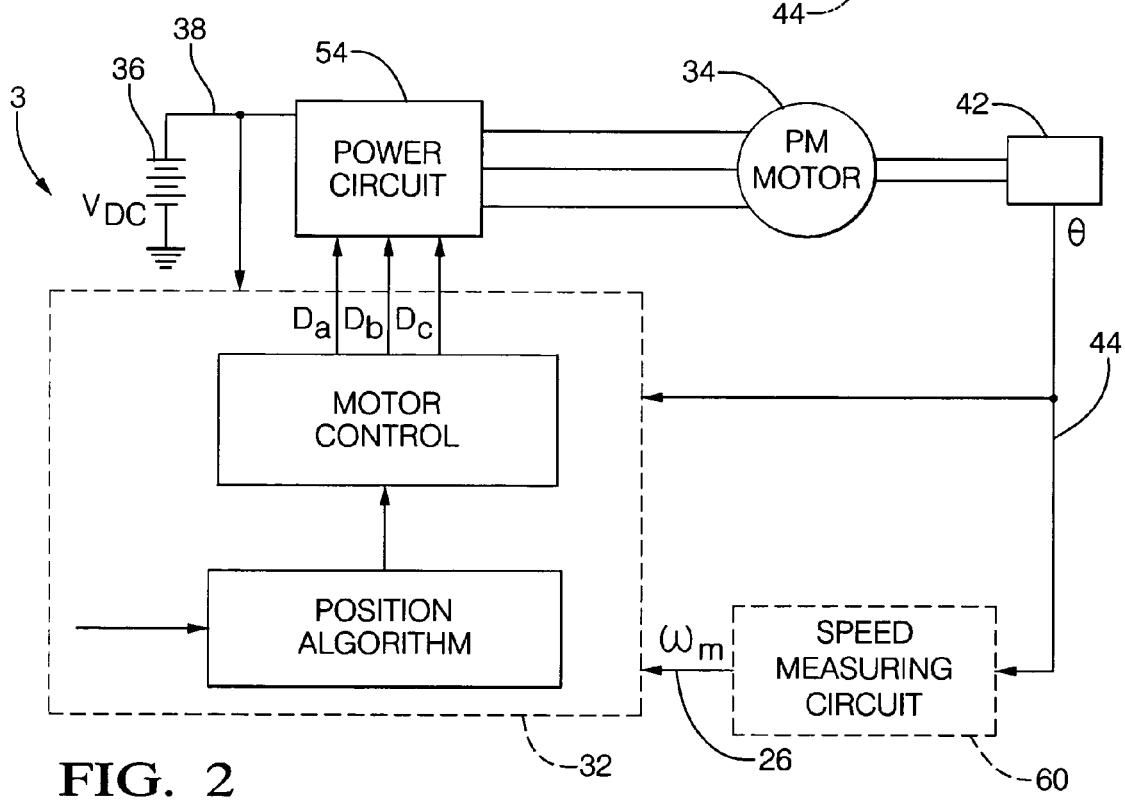
FIG. 2 is a block diagram of a system for controlling an electric machine with a position sensor in accordance with an exemplary embodiment.

FIG. 2 depicts a detailed block diagram of a control system 30 for controlling an electric machine. In an exemplary embodiment the system 30 is configured to control the position of an electric machine 34, including, but not limited to a sinusoidally excited permanent magnet motor, hereinafter referred to as motor 34. The system includes controller 32, a power inverter 54 and a power source 36, position sensor/resolver 42, and an optional speed measuring device or function 60. The power inverter 54 is coupled between power source 36 and the controller 32 to supply the phase voltages across the motor windings. The inverter 54 is controlled by pulse width modulated signals generated by the controller 32. For the controller 32 to develop the correct voltages needed to produce/maintain the desired motor position, the position and/or speed of the rotor are often needed.

From the position signal θ, the optional speed-measuring device or function 60 may be employed to determine the speed of the rotor and outputs a speed signal $\omega_m$ at a line 26. Alternatively, speed may be directly calculated as described at a later point herein. The speed-measuring device or function 60 is optionally, and preferably integral with the controller 32. The speed measuring device or function 60 may include various methods for evaluating velocity from the position signal θ. For example the speed signal may be obtained by a method such as the derivative of the position signal from the equation $\omega_m = \Delta\theta_m/\Delta t$ where $\Delta t$ is the sampling time and $\Delta\theta_m$ is the change in position during the sampling interval.

The position signal θ, and/or speed signal $\omega_m$, are applied to the controller 32. The controller 32 processes all input signals to generate values corresponding to each of the signals resulting in a rotor position value, and a motor speed value, being available for the processing in the algorithms as prescribed herein. Measurement signals, such as the above-mentioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the execution of the motor control and resolver signal processing algorithm(s), prescribed herein, and the like), controller 32 may include, but not be limited to, a processor(s), microcontroller unit(s) MCU, digital signal processor (DSP), computer(s), memory, storage, register(s), timing, interrupt(s), communication interfaces, and input/output signal interfaces, as well as combinations comprising at least one of the foregoing. For example, controller 18 may include signal input signal filtering to enable accurate sampling and conversion or acquisitions of such signals from communications interfaces. Additional features of controller 18 and certain processes therein are thoroughly discussed at a later point herein.

Figure 3:
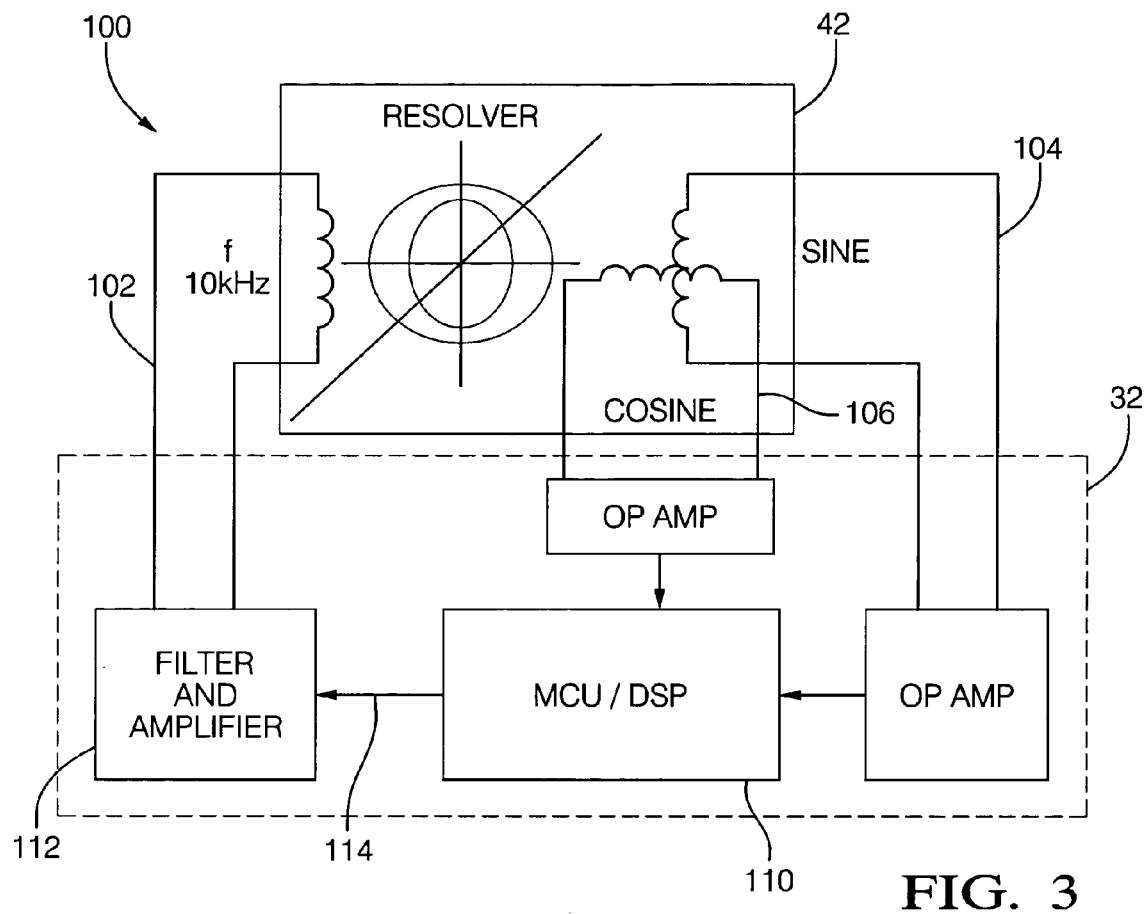
FIG. 3 is of a more detailed diagram of an exemplary embodiment.

Turning now to FIG. 3, a block diagram depicting a portion of the interfaces between the resolver 42 with a MCU/controller 32 and direct decoding of resolver signals by the controller 32 without using the dedicated R/D converter. The interface shown generally as 100 includes a mechanism for generation of the excitation signals 102 to the resolver 42, amplitude demodulation and decoding of the sine resolver signal 104 and cosine resolver signal 106, as well as compensation for a phase shift introduced by cable length between the controller 32 and resolver 42. This interface 100 utilizes part of the computational power of controller 32 or a microcontroller 110 therein, at least one or two analog to digital (A/D) input channels and one digital output from the microcontroller 110, a filtering and amplifying circuit 112 and a decoding algorithm to compute the position information θ, and velocity $\omega_m$ of the rotating shaft of the motor 34. It also includes a method of timing and coordinating the A/D sampling to reduce the complexity of demodulation to acquire sin θ and cos θ and compute position information θ, and velocity $\omega_m$ therefrom. Advantageously this approach eliminates the need for employing the optional speed measuring device/function 60 introduce above.

Continuing with FIG. 3, a digital output port from the microcontroller unit (MCU) of controller 32 is used to generate a high frequency excitation signal 102. In an exemplary embodiment a frequency of about 10 KHz is employed, however, other frequencies are possible. The frequency need only be within a range of effective operation for the transformer characteristics of the resolver 42 and the detection capabilities of the interface circuitry 100. The excitation signal 102 may be generated in a square waveform or pulse width modulated sinusoid with a fundamental frequency at the specified frequency of 10 KHz. The excitation signal 102 can also come from a D/A channel from the microcontroller 110. In an exemplary embodiment the output signal 114 from the microcontroller 110 is applied to the filter and amplifier 112 to be filtered to achieve a substantially sinusoidal waveform with little distortion. The excitation signal 102 is amplified and transmitted to the input winding of the resolver 42. Advantageously, this approach relies on the MCU 110 to precisely generate the excitation source avoiding the need for a separate signal generator.

Figure 4:
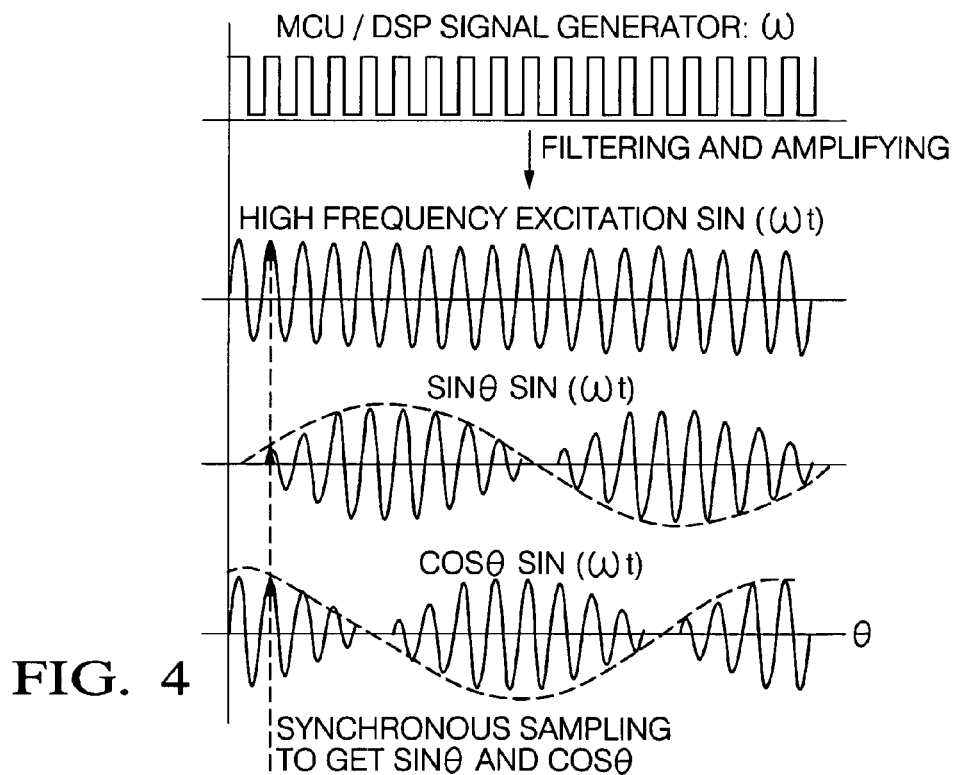
FIG. 4 is graph depicting signals and synchronous sampling of an exemplary embodiment.

Continuing with FIG. 3 and now turning to FIG. 4 as well, in an exemplary embodiment, the sine resolver signal 104 and cosine resolver signal 106 are sampled directly by the A/D converter of the MCU or DSP 110. A level shift circuit or function may be employed to convert the AC signals into a unipolar format to facilitate the direct sampling by the A/D. Since the position information θ is encoded into the amplitude of the signals at the carrier frequency (10 KHz in this instance), the A/D may be configured to over sample and process the signals for the amplitude information. However, such oversampling for data encoded at a high carrier frequency is processing intensive and would require significant amounts of memory for storage of the data. The sampled data may then be demodulated employing any number of known techniques such as peak detection and the like.

In another exemplary embodiment, a synchronous sampling method, which requires only a single sample per cycle of the excitation signal 102, is disclosed to reduce the A/D sampling and processing requirements to achieve the demodulation. In this methodology, the A/D sampling relies on selective timing to sample and hold the resolver output signals 104, 106 at the moment when they reach the peak in each half of the excitation cycle. In this manner, each resulting sample represents only the amplitude variation corresponding to the sin θ and cos θ information with the carrier frequency component removed.

In steering control system, the steering algorithms may operate at a lower frequency, e.g. 10-1000 Hz, while the motor control portion e.g., pulse width modulation, may operate at a higher frequency (e.g., 20 KHz). In an exemplary embodiment, the motor control (e.g., PWM algorithm) is configured to run on the same processor (e.g., MCU, DSP, and the like) as the slower frequency section of steering algorithms. Furthermore, the resolver functionality and algorithms of an exemplary embodiment may readily be integrated with the high frequency motor control functions. In a controller structure where the motor control operates on a separate device as opposed to the main processor, a high frequency process loop may be created in the main processor to run the resolver algorithm.

Continuing with FIGS. 3 and 4 the synchronous sampling or over sampling yields the sin θ and cos θ information. However, to obtain the position and speed information θ and $\omega_m$ respectively, a decoding algorithm is employed. In an exemplary embodiment the decoding of sin θ and cos θ may be accomplished by MCU/DSP 110 in software.

Figure 5:
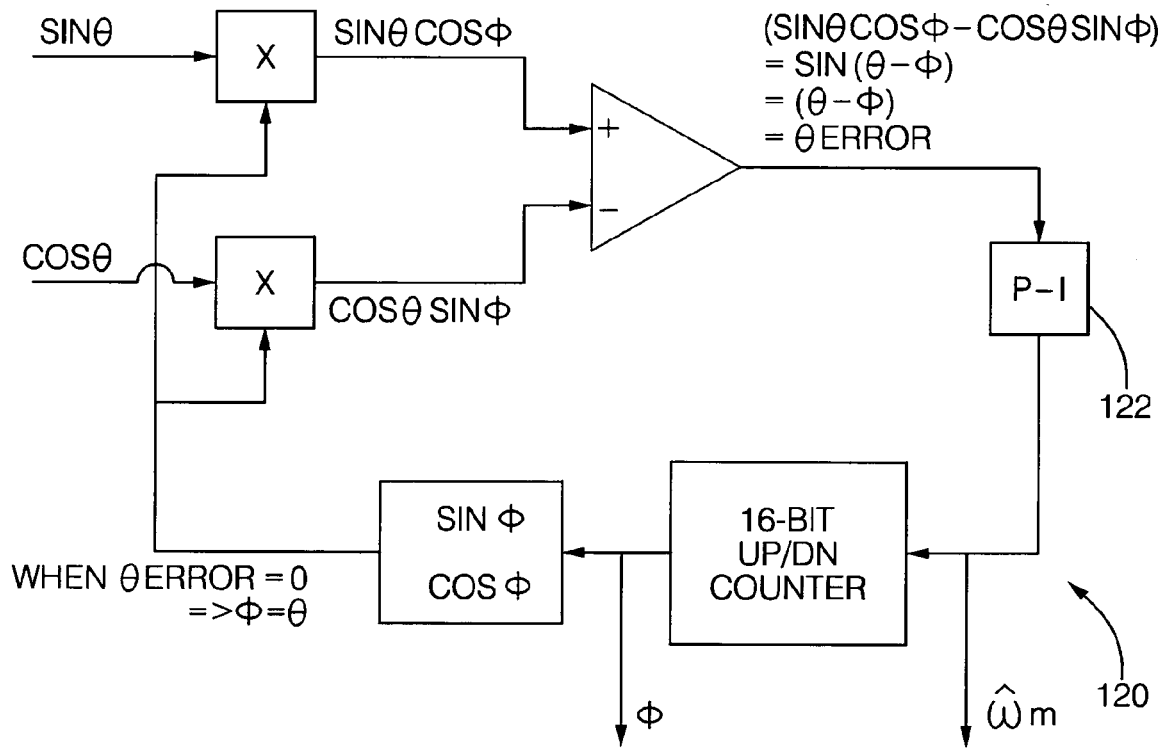
FIG. 5 is a block diagram depicting a configuration for decoding position information from sin θ and cos θ in accordance with an exemplary embodiment.

As shown in FIG. 5, an exemplary decoding algorithm is implemented based on trigonometric principles and a basic feedback loop. An initial estimate of the actual position information θ denoted as φ is established to generate an corresponding estimate of sin θ and cos θ denoted as sin φ and cos φ respectively. Employing the well known trigonometric function:

$$\sin(\theta-\phi)=\sin\theta\cos\phi-\cos\theta\sin\phi.$$

By calculating sin θ cos φ−cos θ sin φ, the sine of the error of sin (θ−φ) can be determined. A well-known simplification employing a small angle approximation yields the error θ−φ. Advantageously, as depicted in FIG. 5, this error can then be used to drive a feedback loop 120 configuration with a P-I type regulator 122 to generate a signal representing the estimated speed, denoted $\hat{\omega}_m$. Due to this closed loop correction mechanism, the estimate error will be driven to zero and the estimated angle φ, will converge to the actual angle θ. This feedback is thus capable of decoding both the speed and the position of the resolver 42. It should once again be appreciated that similar trigonometric principles may be employed for other types of position sensors e.g., synchros to facilitate decoding the signals therefrom.

Figure 6:
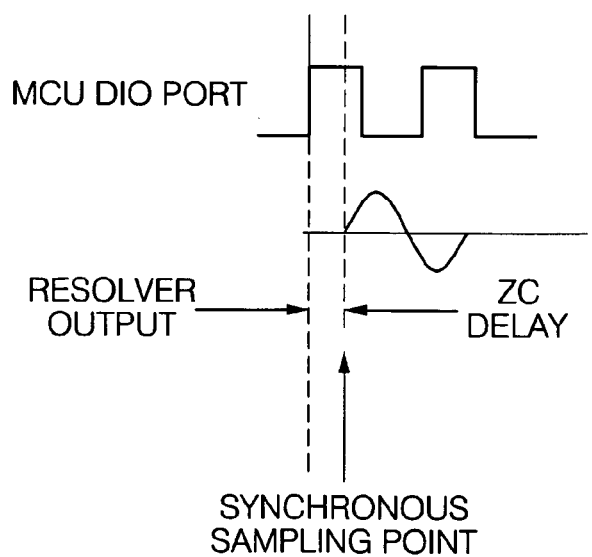
FIG. 6 is graph depicting signals and synchronous sampling of an exemplary embodiment to address phase delay.

Turning now to FIG. 6, one of the errors that can be introduced by utilizing resolver 42 is due to signal phase/ propagation delay in a long interconnection cable. Such a delay can become problematic if the synchronous sampling of an exemplary embodiment is controlled by timing only the peak of the excitation signal 102. In other words, due to transmission of the excitation signal in the cable, the two output signals 104, 106 of resolver 42 may exhibit a phase shift relative to the excitation signal 102. Disclosed herein in another exemplary embodiment, is a method to address this potential error and compensate for phase delays introduced by the resolver 42 or any interconnection cabling. In an exemplary embodiment the timing and/or phase delay of the resolver output signals 104, 106 relative to excitation signal 102 is measured by evaluating the zero crossings of the signals as generated and received. This time difference corresponds to a propagation delay and phase shift between input and output of the resolver 42. The time shift may then be applied to correct the timing the synchronous sampling of the resolver output signals 104 and 106 to ensure that the peak of the signal is accurately sampled. Advantageously, this phase shift measurement would need to be performed only once whenever the system is powered. Therefore the phase shift error can be compensated for any cable length or resolver phase delay tolerance.

The disclosed invention can be embodied in the form of computer, controller, or processor implemented processes and apparatuses for practicing those processes. The present invention can also be embodied in the form of computer program code containing instructions embodied in tangible media 56 such as floppy diskettes, CD-ROMs, hard drives, memory chips, or any other computer-readable storage medium, wherein, when the computer program code is loaded into and executed by a computer, controller, or processor 32, the computer, controller, or processor 32 becomes an apparatus for practicing the invention. The present invention may also be embodied in the form of computer program code as a data signal 57 for example, whether stored in a storage medium 56, loaded into and/or executed by a computer, controller, or processor 32 or transmitted over some transmission medium, such as over electrical wiring or cabling, through fiber optics, or via electromagnetic radiation, wherein, when the computer program code is loaded into and executed by a computer 32, the computer 32 becomes an apparatus for practicing the invention. When implemented on a general-purpose processor the computer program code segments configure the processor to create specific logic circuits.

It will be appreciated that the use of "first" and "second" or other similar nomenclature for denoting similar items is not intended to specify or imply any particular order unless otherwise specifically stated. Similarly, use of "a" or "an" shall be construed to mean "one or more" unless otherwise specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of interfacing an electromagnetic sensor with a controller in a control system comprising:

applying an excitation signal to the electromagnetic sensor;

receiving a first electromagnetic sensor output signal based on said excitation signal, said first electromagnetic sensor signal comprising an amplitude modulated signal corresponding to a position of a rotor of the electromagnetic sensor;

receiving a second electromagnetic sensor output signal based on said excitation signal, said second electromagnetic sensor signal comprising another amplitude modulated signal corresponding to said position of said rotor of the electromagnetic sensor;

sampling said first electromagnetic sensor signal and said second electromagnetic sensor signal at about an instance synchronous with said excitation signal to demodulate said first electromagnetic sensor signal and said second electromagnetic sensor signal; and decoding a resultant of said sampling to identify said position of a rotor of the electromagnetic sensor.

2. The method of claim 1 further including generating said excitation signal.

3. The method of claim 2 wherein said excitation signal is based on a frequency employed by said controller for existing control functions.

4. The method of claim 3 wherein said frequency is about equivalent to another frequency employed for pulse width modulation control.

5. The method of claim 1 wherein said sampling is a direct sampling of said first electromagnetic sensor signal and said second electromagnetic sensor signal, independent of any intermediate conversion interfaces.

6. The method of claim 1 wherein said excitation signal is at a frequency in the range of about 2000 Hz to 25,000 Hz.

7. The method of claim 1 wherein one of said first electromagnetic sensor output and signal said second electromagnetic sensor output signal corresponds to a sine of said position of said rotor of the electromagnetic sensor, while the other corresponds to a cosine of said position of said rotor of the electromagnetic sensor.

8. The method of claim 1 wherein said electromagnetic sensor is a resolver and a first resultant of said sampling corresponds to a sine of said position of said rotor of the electromagnetic sensor and a second resultant of said sampling corresponds to a cosine of said position of said rotor of the electromagnetic sensor.

9. The method of claim 1 wherein said electromagnetic sensor is a synchro and a first resultant of said sampling corresponds to a first sine of said position of said rotor of the electromagnetic sensor, a second resultant of said sampling corresponds to a second sine of said position of said rotor of the electromagnetic sensor, and a third resultant of said sampling corresponds to a third sine of said position of said rotor of the electromagnetic sensor.

10. The method of claim 1 wherein said sampling is at about a frequency of said excitation signal.

11. The method of claim 10 wherein said sampling is concurrent with about a peak of at least one of said first electromagnetic sensor signal or said second electromagnetic sensor signal.

12. The method of claim 1 further comprising ascertaining a phase difference between said excitation signal and at least one of said first electromagnetic sensor output signal or said second electromagnetic sensor output signal.

13. The method of claim 12 wherein said sampling is at about a frequency of said excitation signal as well as synchronous with said excitation signal and said phase difference to compensate therefor.

14. The method of claim 1 wherein said decoding includes a trigonometric function.

15. A system for interfacing an electromagnetic sensor with a controller in comprising:
a electromagnetic sensor, said electromagnetic sensor receptive to an excitation signal and transmitting a first electromagnetic sensor output signal based on said excitation signal and a second electromagnetic sensor output signal based on said excitation signal, said first electromagnetic sensor signal comprising an amplitude modulated signal corresponding to a position of a rotor of the electromagnetic sensor, said second electromagnetic sensor signal comprising another amplitude modulated signal corresponding to said position of said rotor of the electromagnetic sensor;
a controller receptive to said first electromagnetic sensor output signal and said second electromagnetic sensor signal; said controller sampling said first electromagnetic sensor signal and said second electromagnetic sensor signal at about an instance synchronous with said excitation signal to demodulate said first electromagnetic sensor signal and said second electromagnetic sensor signal; said controller further decoding a resultant of said sampling to identify said position of a rotor of the electromagnetic sensor.

16. The system of claim 15 further including said controller generating said excitation signal.

17. The system of claim 16 wherein said excitation signal is based on a frequency employed by said controller for existing control functions.

18. The method of claim 17 wherein said frequency is about equivalent to another frequency employed for pulse width modulation control of a motor.

19. The method of claim 15 wherein said sampling is a direct sampling of said first electromagnetic sensor signal and said second electromagnetic sensor signal, independent of any intermediate conversion interfaces.

20. The system of claim 15 wherein said excitation signal is at a frequency in the range of about 2000 Hz to 25,000 Hz.

21. The system of claim 15 wherein one of said first electromagnetic sensor output and signal said second electromagnetic sensor output signal corresponds to a sine of said position of said rotor of the electromagnetic sensor, while the other corresponds to a cosine of said position of said rotor of the electromagnetic sensor.

22. The system of claim 15 wherein said electromagnetic sensor is a resolver and a first resultant of said sampling corresponds to a sine of said position of said rotor of the electromagnetic sensor and a second resultant of said sampling corresponds to a cosine of said position of said rotor of the electromagnetic sensor.

23. The system of claim 15 wherein said electromagnetic sensor is a synchro and a first resultant of said sampling corresponds to a first sine of said position of said rotor of the electromagnetic sensor, a second resultant of said sampling corresponds to a second sine of said position of said rotor of the electromagnetic sensor, and a third resultant of said sampling corresponds to a third sine of said position of said rotor of the electromagnetic sensor.

24. The system of claim 15 wherein said sampling is at about a frequency of said excitation signal.

25. The system of claim 24 wherein said sampling is concurrent with about a peak of at least one of said first electromagnetic sensor signal or said second electromagnetic sensor signal.

26. The system of claim 12 further comprising ascertaining a phase difference between said excitation signal and at least one of said first electromagnetic sensor output signal or said second electromagnetic sensor output signal.

27. The system of claim 26 wherein said sampling is at about a frequency of said excitation signal as well as synchronous with said excitation signal and said phase difference to compensate therefor.

28. The system of claim 15 wherein said decoding includes a trigonometric function.

29. A system for interfacing a electromagnetic sensor with a controller comprising:
means for applying an excitation signal to the electromagnetic sensor;
means for receiving a first electromagnetic sensor output signal based on said excitation signal, said first electromagnetic sensor signal comprising an amplitude modulated signal corresponding to a position of a rotor of the electromagnetic sensor;
means for receiving a second electromagnetic sensor output signal based on said excitation signal, said second electromagnetic sensor signal comprising another amplitude modulated signal corresponding to said position of said rotor of the electromagnetic sensor;
means for sampling said first electromagnetic sensor signal and said second electromagnetic sensor signal at about an instance synchronous with said excitation signal to demodulate said first electromagnetic sensor signal and said second electromagnetic sensor signal; and means for decoding a resultant of said sampling to identify said position of a rotor of the electromagnetic sensor.

30. A storage medium encoded with machine-readable computer program code for of interfacing a electromagnetic sensor with a controller, said storage medium including instructions for causing a computer to implement a method comprising:

applying an excitation signal to the electromagnetic sensor;

receiving a first electromagnetic sensor output signal based on said excitation signal, said first electromagnetic sensor signal comprising an amplitude modulated signal corresponding to a position of a rotor of the electromagnetic sensor;

receiving a second electromagnetic sensor output signal based on said excitation signal, said second electromagnetic sensor signal comprising another amplitude modulated signal corresponding to said position of said rotor of the electromagnetic sensor;

sampling said first electromagnetic sensor signal and said second electromagnetic sensor signal at about an instance synchronous with said excitation signal to demodulate said first electromagnetic sensor signal and said second electromagnetic sensor signal; and decoding a resultant of said sampling to identify said position of a rotor of the electromagnetic sensor.

31. A computer data signal, said computer data signal embodied in a computer readable medium comprising code configured to cause a computer to implement a method for of interfacing a electromagnetic sensor with a controller comprising:

applying an excitation signal to the electromagnetic sensor;

receiving a first electromagnetic sensor output signal based on said excitation signal, said first electromagnetic sensor signal comprising an amplitude modulated signal corresponding to a position of a rotor of the electromagnetic sensor;

receiving a second electromagnetic sensor output signal based on said excitation signal, said second electromagnetic sensor signal comprising another amplitude modulated signal corresponding to said position of said rotor of the electromagnetic sensor;

sampling said first electromagnetic sensor signal and said second electromagnetic sensor signal at about an instance synchronous with said excitation signal to demodulate said first electromagnetic sensor signal and said second electromagnetic sensor signal; and decoding a resultant of said sampling to identify said position of a rotor of the electromagnetic sensor.

* * * * *